Feb. 21, 1939.  C. M. PARK  2,147,666
GENERATION OF POWER
Filed May 28, 1937  2 Sheets-Sheet 1

Inventor:
Chauncey M. Park,
By: Zabel, Carlson, Fitzbaugh & Wells
Attorneys

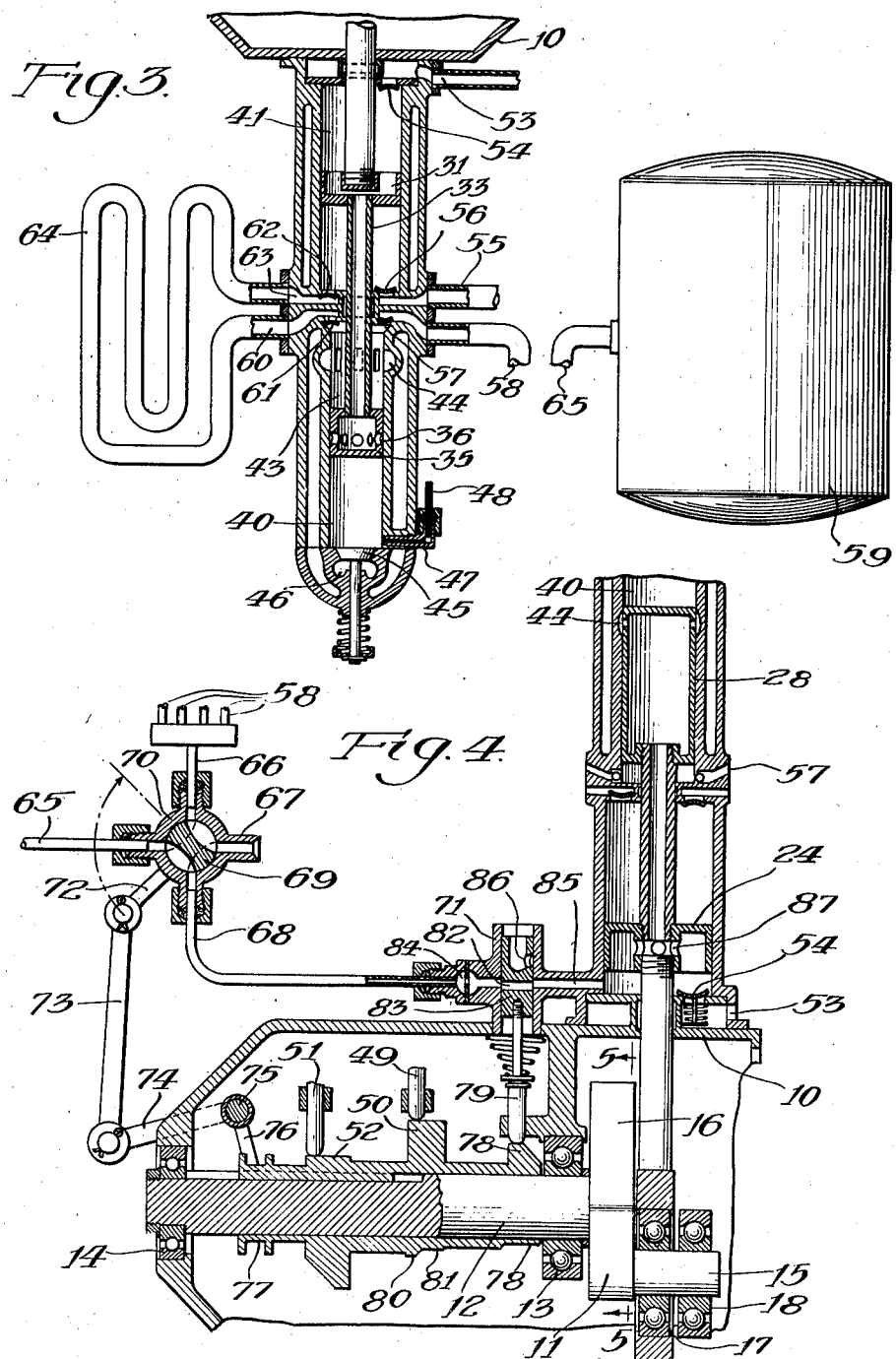

Patented Feb. 21, 1939

2,147,666

UNITED STATES PATENT OFFICE 2,147,666

GENERATION OF POWER

Chauncey M. Park, Evanston, Ill.

Application May 28, 1937, Serial No. 145,287

9 Claims. (Cl. 230—56)

The present invention relates to the generation of power and more particularly to the transformation of the potential energy of one fluid medium into energy which may be stored in a second fluid or utilized by means of a second fluid.

Heretofore, it has been known to utilize the potential heat energy of fuel in an internal combustion engine thereby transforming a part of the heat energy into mechanical movement which in turn has been utilized to drive other mechanisms including air compressors.

The present invention utilizes mechanical movement created by the ignition and combustion of fuel or by the expansion of a compressed fluid as a means of accumulating and storing energy in a fluid under pressure.

It is a purpose of the present invention to provide a novel means whereby energy obtained from one fluid medium is directly transferred to a second fluid medium by reciprocating movements under control of a simple rotating device. In this connection, the invention contemplates the utilization of a plurality of like reciprocating piston assemblies which are so combined as to utilize their respective inertia forces as a means of supplementing the control function of the rotating device.

Another object of the present invention is to provide an improved means by which the potential heat energy of a fuel may be utilized in storing energy in a compressed gas.

My invention contemplates the employment of a novel combination by which the mechanical forces involved in the operation of the apparatus may be so balanced as to reduce the stresses in the various parts thereof and make it unnecessary to employ heavy cumbersome parts.

The invention also contemplates the provision of a novel internal combustion engine—gas compressor combination—by means of which more economical operating characteristics may be obtained. This result is accomplished by a novel arrangement of parts whereby the construction is simplified and the cost of manufacture correspondingly lowered, while at the same time greater efficiency, in so far as frictional and mechanical losses are concerned, is obtained.

One form of the invention is embodied in a machine comprising an internal combustion engine of the compression, ignition, or Diesel type operating in a two stroke cycle and a two stage air compressor combined therewith into a single mechanical unit.

The novel features and advantages of the machine will appear more readily from the following description, reference being had to the accompanying drawings wherein a preferred embodiment of the invention is shown. It is to be understood, however, that the description and drawings are illustrative only and are not to be considered as restricting the invention except in so far as it is limited by the claims.

In the drawings—

Fig. 3 is an enlarged sectional view of one of the engine and compressor units.

Fig. 4 is an enlarged fragmentary sectional view illustrating a portion of the control mechanism by which the machine may be started.

Figure 1:
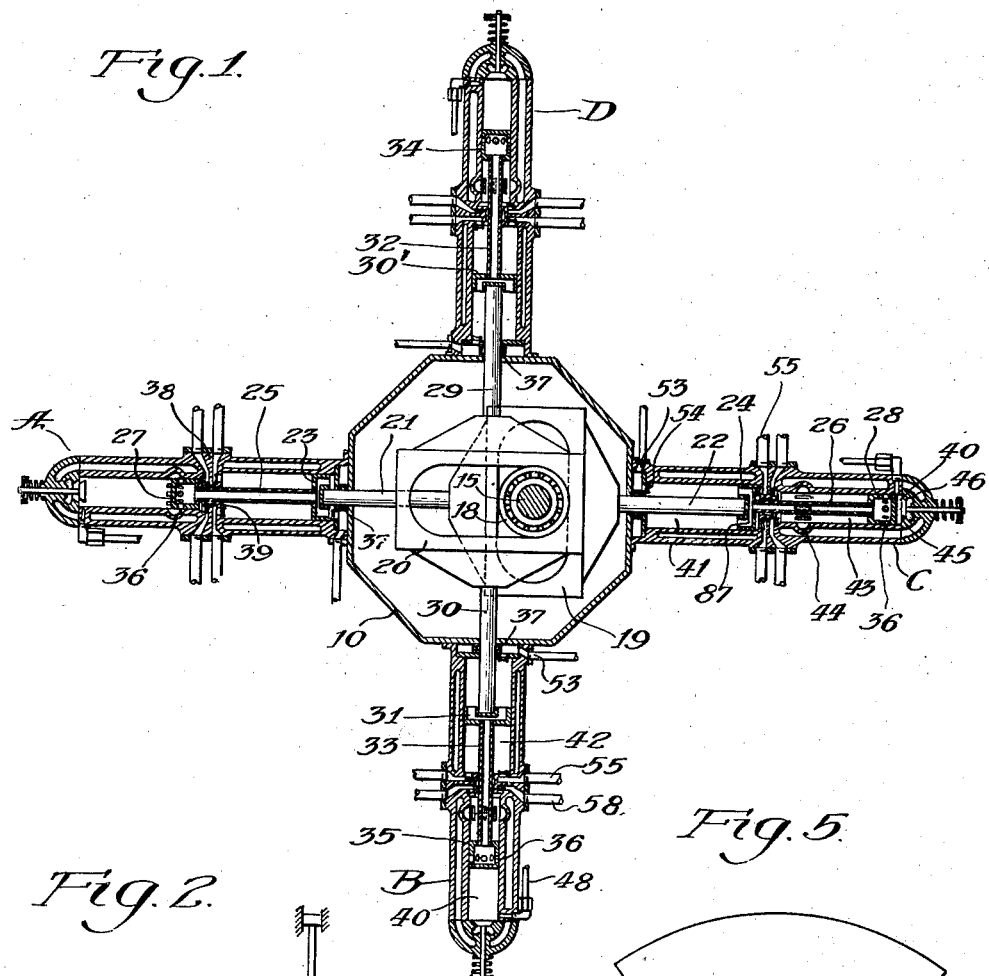
Fig. 1 is a somewhat diagrammatic view illustrating the several engine and air compressor units in section and showing their arrangement with respect to each other.

Referring now in detail to the drawings, the specific embodiment described herein provides for the incorporation of an internal combustion engine of the Diesel type operating in a two stroke cycle and a two stage air compressor into a single mechanical unit. The arrangement of the various parts of this mechanical unit is best illustrated in Fig. 1 which shows the arrangement and relative position of the various essential elements of the unit.

Figure 5:
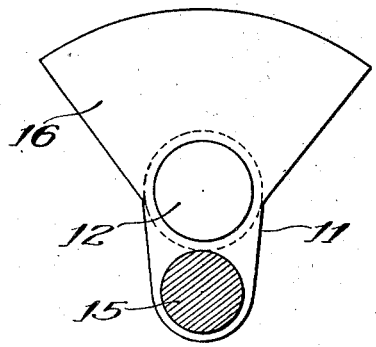
Fig. 5 is an enlarged sectional view taken substantially on the line 5—5 of Fig. 4.

The mechanical unit consists of a central housing or crank case 10 containing an overhung crank 11 attached to a crank shaft 12 which is supported in suitable bearings 13 and 14 (see Fig. 4). The crank is fitted with a crank pin 15, the axis of which is displaced radially with respect to the axis of the crank shaft 12, but which is parallel with that axis. The crank also comprises a counterweight 16 which may desirably be an integral part of the crank. The center of gravity of the counterweight 16 is diametrically opposite the crank pin 15, as shown clearly in Fig. 5.

The crank pin 15 has two bearings 17 and 18 thereon which engage two slotted members 19 and 20, respectively. The member 19 is a part of a rigid piston rod and piston assembly consisting of two piston rods 21 and 22, pistons 23 and 24, hollow piston rods 25 and 26, and hollow pistons 27 and 28. It will be noted that the slot in the member 19 extends at right angles to the longitudinal axis of the piston rod and piston assembly. The member 20 is also a part of a rigid piston rod and piston assembly which comprises two piston rods 29 and 30, pistons 30′ and 31, hollow piston rods 32 and 33, and hollow pistons 34 and 35. The two rigid piston rod and piston assemblies are free to move axially in four tandem cylinder assemblies which are illustrated at A, B, C, and D in Fig. 1. The axial position of the piston rod and piston assemblies with respect to the center of the crank shaft 12 has a definite mathematical relationship to the position of the crank pin 15 in its angular movement around the axis of the crank shaft. When the crank shaft 12 is rotating with constant angular velocity, the piston rod and piston assemblies will move axially in the cylinders with simple harmonic motion.

The axis of each piston rod and piston assembly intersects the axis of the crank shaft 12 at right angles, but the two points of intersection are separated sufficiently axially of the crank shaft to provide clearance for the free movement of the slotted members 19 and 20 in accordance with the rotation of the crank pin around the axis of the crank shaft 12. Since the axis of each piston rod and piston assembly coincides with the axes of the two cylinder assemblies in which it operates, it follows that the axes of the two pairs of cylinder assemblies are separated with respect to their points of intersection with the axis of the crank shaft 12 by the same distance as are the axes of the piston rod and piston assemblies. The cylinder assemblies A, B, C, and D are disposed around the axis of the crank shaft 12 at 90 degree intervals in such a manner that the axes of the two piston rods and piston assemblies lie in planes which intersect at right angles in the axis of the crank shaft.

Figure 2:
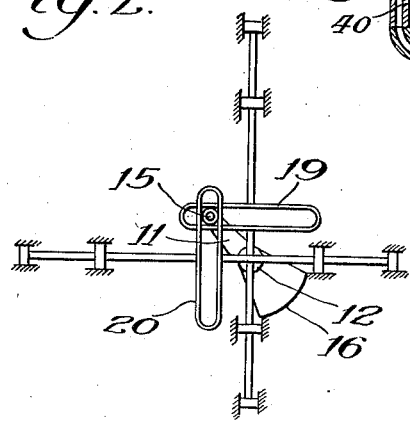
Fig. 2 is a diagrammatic view illustrating the manner in which balance is obtained.

Referring now to the diagrammatic showing in Fig. 2 wherein the movements of the reciprocating and rotating portions of the device may be seen, it will be noted that the movements of the two piston and piston rod assemblies including the slotted members 19 and 20 are at right angles to each other while the crank pin 15 and the counterweight 16 rotate about the axis of the crank shaft 12 which is intercepted by the piston and piston rod assemblies. If the mass of the assembly, including the member 19, is equal to the mass of the member 20, all forces acting in lines perpendicular to the axis of the crank shaft and caused by the reciprocating movements of the piston and piston rod assemblies can be mathematically balanced by the choice of the proper moment for the counterweight 16 around the axis of the crank shaft 12. This mathematical balance will be attained for the two assemblies shown in Fig. 1 when the moment of the counterweight 16 is exactly equal and opposite to the combined moments of the crank pin 15 and the crank 11 plus the moment that would result from the concentration of the mass of either piston and piston rod assembly at the center of the crank pin 15. When three piston and rod assemblies are arranged about the crank shaft in planes making angles of 60° with each other and intersecting in the axis of the crank shaft, a balance will be attained when the moment of the counterweight is equal and opposite to the combined moments of the crank pin 15 and crank 11 plus 1.5 times the moment that would result from concentration of the mass of one piston and piston rod assembly at the center of the crank pin. For any greater even number of piston and piston rod assemblies so arranged as to be equally spaced about the crank shaft, the mass of the counterweight necessary may be calculated and will be a constant for that particular number of assemblies.

The four cylinder assemblies are essentially identical and are essentially equidistant from the axis of the crank shaft 12. The two piston rod and piston assemblies are also substantially identical for each of the four cylinder assemblies. The piston rods 21 and 22 are rigidly attached to the member 19 and to the pistons 23 and 24. The hollow piston rods 25 and 26 are rigidly attached to the outer faces of the pistons 23 and 24, and to the inner faces of the hollow pistons 27 and 28. The hollow piston rods 25 and 26, therefore, establish communication directly between the hollow interiors of the two pistons which they connect. Each of the pistons 27 and 28 is provided with series of openings 36 through the side walls of the pistons. Suitable stuffing boxes are provided at 37 where the several piston rods 21, 22, 29 and 30 extend outwardly through the crank case 10 into the cylinder assemblies. Similarly partitions 38 and stuffing boxes 39 are provided in each of the cylinder assemblies A, B, C, and D.

The head end 40 of the outer cylinder of each cylinder assembly serves as the power cylinder of the internal combustion engine, and the crank end 41 of the inner cylinder of each cylinder assembly serves as the scavenging or precompression cylinder of the internal combustion engine. The head end 42 of the inner cylinder of each cylinder assembly is the low pressure cylinder of the air compressor, and the crank end 43 of the outer cylinder of each cylinder assembly is the high pressure cylinder of the air compressor. Each cylinder assembly is provided with recesses 44 in the wall of the outer cylinder in order to provide communication between the interior of the hollow pistons 27, 28, 34, and 35 and their respective power cylinders 40 through the openings 36 during a predetermined portion of the stroke of the piston.

An exhaust valve 45 is provided in the head of the power cylinder 40 for each cylinder assembly, and this valve when open provides communication with a passage 46 which leads to an exhaust port (not shown) in the cylinder head. The exhaust valve 45 is operated by a suitable push rod (not shown) actuated by a cam attached to the crank shaft. A fuel injection nozzle 47 is connected by means of a tube 48 with a suitable fuel injection pump which is actuated by a second cam attached to the crank shaft 12. The push rods and cams for actuating the exhaust valve and the fuel injection pump are shown at 49, 50, 51, and 52 in Fig. 4. There is a push rod for each power cylinder.

In order that operation of the device will be more fully understood, a complete cycle of operations will now be described. Referring to Fig. 1, the beginning of the power stroke is shown in the cylinder assembly C. Fuel injection begins at approximately the beginning of a stroke, and combustion proceeds until the fuel injection is cut off at a point in the stroke depending on the load requirements. As the stroke continues, air in the scavenging cylinder 41 is compressed into the interiors of the hollow piston 28, piston 24, and the hollow piston rod 26. At a predetermined point near the end of the power stroke, the exhaust valve 45 opens to permit the escape of the products of combustion from the power cylinder 40 through the passage 46 and the exhaust port. At another predetermined point slightly later in the stroke, the recesses 44 in the cylinder wall are uncovered by the piston 28 permitting the compressed air within the pistons 24 and 28 and the hollow rod 26 to enter the power cylinder 40 and flush out the residual products of combustion through the exhaust valves 45. At approximately the end of the power stroke, the exhaust valve 45 closes. At the beginning of the compression stroke, the recesses 44 are covered by the piston 28 and the compression of the charge of air remaining in the cylinder 40 begins. During the compression stroke, air enters the scavenging cylinder 41 through a passage 53 and through a valve 54. Compression in the power cylinder continues to the end of the stroke at approximately which time fuel is again injected through the nozzle 47, and the next power stroke starts.

The air compression cycle follows the engine cycle substantially in the following manner: During the power stroke, air enters the low pressure cylinder 42 through a passage 55 and through an automatic inlet valve 56. At the same time, the air in the high pressure cylinder 43 is undergoing compression. When the pressure in the cylinder 43 becomes sufficiently high, an automatic exhaust valve 57 is forced open against the pressure in the passage 58, and air is exhausted through the passage 58 into a reservoir 59 during the remainder of the stroke. During the compression stroke in the power cylinder 40, the air in the low pressure cylinder 42 is undergoing compression. At the same time, a charge of air is being admitted to the high pressure cylinder 43 through a passage 60 and an automatic inlet valve 61. When the pressure in the low pressure cylinder 42 becomes sufficiently high, an automatic exhaust valve 62 is forced open against the pressure in a passage 63, and the air in the cylinder 42 is exhausted through the passage 63 during the remainder of the stroke. The passages 63 and 60 connect with a suitable interstage cooler 64 by which a portion of the heat of compression in the compressed air from the low pressure cylinder 42 is removed from the air before the air enters the high pressure cylinder 43.

The piston clearances and the diameters of cylinders and piston rods are so proportioned that for any specific combination of the quantity of fuel injection and the energy output of the compressor, the mean effective pressure in the power cylinder 40 will be sufficiently in excess of the sum of the mean effective pressure in the cylinders 41, 42, and 43 during one complete revolution of the crank shaft 12 to overcome essentially one-fourth of the total frictional resistance of the power unit and to maintain rotation of the crank shaft at some specific angular velocity.

It can be shown mathematically that for any given rate of rotation of the crank shaft the kinetic energy represented by the axial movement of the piston rod and piston assemblies such as herein described will be constant when the axis of each piston rod and piston assembly intersects the axis of the crank shaft at right angles and when the piston rod and piston assemblies are operating in two or more pairs of diametrically opposed cylinder assemblies disposed at equal intervals around the center of the crank shaft. It follows, therefore, that all kinetic energy generated through the axial movements of one of the piston rod and piston assemblies is absorbed by the remaining piston rod and piston assemblies, and all kinetic energy absorbed in the axial movement of one of the piston rod and piston assemblies is provided by the remaining piston rod and piston assemblies, and that the transfer of this kinetic energy between the two or more piston rod and piston assemblies takes place through the crank pin. Since the total kinetic energy of the two or more piston rod and piston assemblies is constant, no transfer of kinetic energy occurs between the reciprocating system represented by the piston rod and piston assemblies and the rotating system represented by the crank, crank shaft and counterweight, and there is no tendency toward variation in the angular velocity of the crank shaft due to variation of the kinetic energy of the reciprocating system. This characteristic eliminates any need for a flywheel to reduce variations in the angular velocity of the crank shaft resulting from variations in the kinetic energy of the reciprocating system.

It can also be shown mathematically that for any angular velocity of the crank shaft and counterweight, and for any number of piston rod and piston assemblies operating in two or more pairs of diametrically opposed cylinder assemblies which are disposed at equal intervals around the center of the crank shaft, the axial momentum of each of the piston rod and piston assemblies will be balanced by a component of the momentum of the counterweight in a line parallel to the axis of the piston rod and piston assembly when the momentum of the counterweight around the axis of the crank shaft is equal to the combined moments of the crank, crank pin and a fixed additional mass concentrated at the center of the crank pin. In the unit herein described, the necessary additional mass is equal to the mass of any one of the essentially identical piston rod and piston assemblies. It follows, therefore, that the use of a single counterweight of the proper moment around the axis of the crank shaft will provide balancing components for the axial momentum of all of the piston rod and piston assemblies. Thus, any tendency toward radial translation of the axis of the crank shaft, due to the axial movements of the piston rod and piston assemblies, is eliminated. The entire control of the reciprocatory movements of the piston and piston rod assemblies is from the cam shaft 12, as will be readily understood from the showing in Fig. 4. The push rods 49 and 51 are provided at 90° intervals around the shaft 12 so that the cams 50 and 52 will actuate them in sequence as the shaft 12 rotates. The crank shaft 12 also is utilized in the starting of the power unit which will now be described in detail.

The method of starting the power unit is illustrated in Figure 4. Starting is accomplished by means of compressed air from a suitable source, and the supply of compressed air is conducted through a pipe 65 to a four-way valve 70. A pipe 66, from this valve leads to the exhaust port 57 of the high pressure air compressing cylinder. A pipe 68 leads to a cam actuated starting valve 71, and the fourth opening 67 in the valve 70 is open to the atmosphere. Valve 70 contains a rotor 69 which is rotated by means of a lever 72 and a connecting link 73.

The connecting link 73 is attached to a lever 74, and the lever 74 is rigidly attached to the end of a shaft 75 outside of the crankcase of the power unit. Shaft 75 projects into the crankcase where it carries a suitable yoke member 76 which engages a circumferential groove 77 which is part of the cam assembly. A plurality of cams 50, 52 and 78 are integral parts of the cam assembly, and the cylindrical body of the assembly is keyed or splined to the crankshaft 12 of the power unit. It will be seen that the cam assembly may be moved axially along the crank shaft by the movement of the lever 74.

The cam 52 in its rotation, imparts vertical motion to the pushrod 51 which operates one of the fuel injection pumps for the power unit. The cam 50 imparts vertical motion to the pushrod 49 which operates a power cylinder exhaust valve. The starting air valve is actuated by cam 78 through a pushrod 79. At the limit of its movement to the right as shown in Figure 4, the cam assembly is in such a position that the three pushrods shown are riding on the extreme left of the surfaces of their respective cams. In this position, pushrod 51 rides on a circular portion of cam 52 and receives no vertical motion with the result that no fuel injection occurs in the power cylinder. Pushrod 49, at the bottom of its stroke, rides on an elevated portion 80 of its cam, and the elevation is such that the exhaust valve is not permitted to close entirely during any portion of the rotation of the cam. Pushrod 79 rides on the left of the surface of cam 78 and receives the full vertical movement for which the cam is designed.

In the intermediate position of the cam assembly on the crankshaft, the three pushrods ride in the centers of the cams. In this position cam 52 imparts motion to pushrod 51, and fuel injection occurs. Pushrod 49 rides on the portion 81 of the face of its cam, and the exhaust valve is permitted to close completely at the bottom of the stroke of 49. Pushrod 79 continues to ride on the elevated portion of cam 78.

When the cam assembly is moved to the extreme left limit of its travel, it is in what may be called the running position. In this position, cams 52 and 50 impart full normal motion to their pushrods, but cam 78 is withdrawn to the extent that it no longer makes contact with pushrod 79 which remains stationary at the extreme bottom of its stroke.

Since the pushrods shown are for only one of the four cylinder assemblies of the power unit, and since the pushrods for the other three cylinder assemblies are actuated by the same cams, an explanation of the starting cycle in one of the cylinder assemblies will explain the starting of the entire unit.

When the starting lever 74 is moved down into the starting position as shown in Figure 4, the rotor 69 of the valve 70 is moved to the position shown, and compressed air from the storage reservoir 59 is made available to the starting air valve 71 through pipes 65 and 68. At the same time, the exhaust port of the high pressure air compressing cylinder is opened to the atmosphere through pipe 66 and opening 67. The cam 78 is so positioned with respect to the rotation of the crankshaft 12 that the passage 82 of the valve piston 83 is brought into register with the air inlet and outlet passages of valve body 71 at a point in the up-stroke of a power piston 28 when the recesses 44 in the walls of power cylinder 40 have been completely covered by piston 28. The compressed air enters passage 82 through an orifice 84 and leaves through passage 85, which leads to the scavenging or pre-compression cylinder 41 where the air exerts an upward pressure on piston 24.

As the piston and piston rod assembly moves upward under the influence of the air pressure in cylinder 41, the cam 78 rotates with the crankshaft until it has traveled through an angle of slightly more than 90 degrees. At this point, the cam is reduced in diameter to the extent that valve piston 83 is lowered just enough to cut off the air intake to cylinder 41 but not enough to bring opening 86 into register with passage 85. The compressed air in cylinder 41, together with that which has entered the interior of piston 28 through the openings 87 in the hub of piston 24 and through the tubular piston rod 26, expands until approximately the end of the up-stroke. At that point, a further reduction in the diameter of cam 78 permits the valve piston 83 to be lowered to the point where opening 86 registers with passage 85 and permits the compressed air in cylinder 41 and piston 28 to exhaust to the atmosphere.

Shortly after the start of the down-stroke of piston 24, the exhaust is cut off by raising the valve piston 83 to the point where passage 85 is closed, and valve 83 remains in this position until the start of the next cycle on the up-stroke of the piston 24.

During this portion of the starting cycle, the cam assembly has been in its starting position at the extreme right end of its travel along the crankshaft. In this position, there has been no injection of fuel into the power cylinders, and the exhaust valves have been kept open to relieve the compression in the power cylinders. The compressor has also been unloaded by permitting it to exhaust to the atmosphere through opening 67. As the angular velocity of the crankshaft increases, the air pressure admitted to cylinder 41 is automatically reduced by the throttling action of orifice 84. This automatic throttling conserves the supply of compressed air in the storage reservoir and prevents the attainment of rotational velocities that might disrupt the power unit.

As soon as the crankshaft is rotating freely, starting lever 74 is raised to the intermediate position, and in this position the compressed air inlet and exhaust cycle of cylinder 41 remains unchanged. Rotation continues under the influence of the compressed air, but the exhaust valve is closed normally during the compression stroke in the power cylinder, and fuel injection occurs normally at the end of the compression stroke. If the rotational velocity is sufficiently high at this point, heat losses to the cylinder walls and piston will be reduced enough for the development of firing temperatures at the end of the compression stroke. Since the compressed air exhaust from cylinder 41 is closed shortly after the start of the downstroke of the piston, pre-compression of the residual air is obtained during the remainder of the stroke, and this air is released into the power cylinder at the bottom of the stroke through openings 36 and recesses 44. It is obvious, therefor, that the pre-compression or scavenging function of cylinder 41 is not affected by the use of it as the compressed air starting cylinder for the power unit, the starting function occurring only during the up-stroke and the pre-compression and scavenging functions occurring only during the down-stroke.

As soon as normal firing is established in the power cylinders, the starting lever 74 is raised to the running positon in which cam 78 is withdrawn permitting the valve piston 83 to drop to its extreme low position in which the passage 85 is closed by that portion of the skirt of piston 83 which is above the opening 86. At the same time, rotor 69 of valve 70 is rotated to the position shown by the dotted lines. In that position, pipe 66 from the exhaust port of the high pressure air compressing cylinder communicates with pipe 65 leading to the compressed air reservoir, and pipe 68 communicates with the atmosphere through opening 67.

In the running position, scavenging air enters cylinder 41 through passage 53 and the spring loaded inlet valve 54 during the up-stroke of the piston, and compressed air from the high pressure air compressing cylinder 43 exhausts into the air storage reservoir in the normal manner.

Having thus described my invention, what I claim as new and desire to secure by Letters Patent is:

1. In a machine of the character described, opposed pairs of duplicate cylinders arranged about a common center line with their axes separated by equal angles, pistons in said cylinders, rigid piston rods connecting the opposed pairs of pistons, a crank having a shaft whose axis is said common center line, a crank pin on said crank, said piston rods having bearings for said crank pin, permitting movement of the crank pin at right angles to the piston rod axis as the crank pin is rotated, and a counterweight on said crank, diametrically opposed to said crank pin, for balancing the moments caused by the reciprocating movements of the piston and rod assemblies.

2. A machine for transferring energy from one fluid to another comprising opposed pairs of cylinder assemblies and pistons therein, the pistons in opposed cylinders being connected by rigid piston rods, and a rotating control device operatively connected with said piston rods and cooperating therewith to cause reciprocation of said pistons in a predetermined relation, said control device including means for balancing the moments caused by reciprocation of the piston rods.

3. In a machine of the character described, a cylinder and piston assembly comprising two cylinders arranged in tandem, a piston in each cylinder, one of said pistons having a fluid chamber therein, a tubular piston rod connecting said pistons and opening at one end into said chamber, the other end of said piston rod passing through and opening on the outer face of the other piston, an inlet valve in the cylinder for said other piston for admitting air to the outer face thereof, said hollow piston and the cylinder in which it is located having cooperating passages whereby in one position of the hollow piston fluid may pass from within the hollow piston to the interior of its cylinder beyond the outer face of the hollow piston.

4. In a machine of the character described, a cylinder and piston assembly comprising two cylinders arranged in tandem, a piston in each cylinder, one of said pistons having a fluid chamber therein, a tubular piston rod connecting said pistons and opening at one end into said chamber, the other end of said piston rod passing through and opening on the outer face of the other piston, an inlet valve in the cylinder for said other piston for admitting air to the outer face thereof, said hollow piston and the cylinder in which it is located having cooperating passages whereby in one position of the hollow piston fluid may pass from within the hollow piston to the interior of its cylinder beyond the outer face of the hollow piston, said cylinders having valved inlet and outlet ports at their adjacent ends, and means connecting the inlet port of the cylinder containing the hollow piston with the outlet port of the other cylinder.

5. In a machine of the character described, a cylinder and piston assembly comprising two cylinders arranged in tandem, a piston in each cylinder, one of said pistons having a fluid chamber therein, a tubular piston rod connecting said pistons and opening at one end into said chamber, the other end of said piston rod passing through and opening on the outer face of the other piston, an inlet valve in the cylinder for said other piston for admitting air to the outer face thereof, said hollow piston and the cylinder in which it is located having cooperating passages whereby in one position of the hollow piston fluid may pass from within the hollow piston to the interior of its cylinder beyond the outer face of the hollow piston, said cylinders having valved inlet and outlet ports at their adjacent ends, and means connecting the inlet port of the cylinder containing the hollow piston with the outlet port of the other cylinder, and a storage reservoir connected to the outlet port of the cylinder containing the hollow piston.

6. A power generating and transmitting machine having in combination opposed pairs of cylinders, each pair comprising a combustion and high pressure compression cylinder and a scavenging and low pressure compression cylinder, pistons in said cylinders, all pistons being rigidly connected together to form a single reciprocal assembly.

7. A power generating and transmitting machine having in combination opposed pairs of cylinders, each pair comprising a combustion and high pressure compression cylinder and a scavenging and low pressure compression cylinder, pistons in said cylinders, all pistons being rigidly connected together to form a single reciprocal assembly, and means operable to balance the mass of reciprocating parts of the said assembly.

8. A power generating and transmitting machine comprising a combined two stroke cycle internal combustion engine and high and low stage air compressors, said machine comprising at least two assemblies, each assembly comprising opposed pairs of cylinders in which each pair includes a combustion and high pressure compression cylinder and a scavenging and low pressure compression cylinder, pistons in said cylinders, the pistons in each assembly being rigidly connected together to form a single reciprocating assembly and the pairs of cylinders in an assembly being opposed, a rotating control device operatively connected with the pistons and cooperating therewith to cause reciprocation of the pistons in a predetermined relation.

9. A power generating and transmitting machine comprising a combined two stroke cycle internal combustion engine and high and low stage air compressors, said machine comprising at least two assemblies, each assembly comprising opposed pairs of cylinders in which each pair includes a combustion and high pressure compression cylinder and a scavenging and low pressure compression cylinder, pistons in said cylinders, the pistons in each assembly being rigidly connected together to form a single reciprocating assembly and the pairs of cylinders in an assembly being opposed, a rotating control device operatively connected with the pistons and cooperating therewith to cause reciprocation of the pistons in a predetermined relation, said control device comprising a crank and said assemblies being rotatingly disposed about the axis of rotation of said crank, said crank including a counterweight balancing all of the moments caused by the reciprocation of the assemblies.

CHAUNCEY M. PARK.